United States Patent
Chang et al.

(10) Patent No.: US 11,829,698 B2
(45) Date of Patent: Nov. 28, 2023

(54) GUIDED POWER GRID AUGMENTATION SYSTEM AND METHOD

(71) Applicant: Synopsys, Inc., Sunnyvale, CA (US)

(72) Inventors: Hsiang-Wen Chang, Taipei (TW); Yang-Ming Chen, Taipei (TW)

(73) Assignee: Synopsys, Inc., Sunnyvale, CA (US)

( * ) Notice: Subject to any disclaimer, the term of this patent is extended or adjusted under 35 U.S.C. 154(b) by 169 days.

(21) Appl. No.: 17/402,046

(22) Filed: Aug. 13, 2021

(65) Prior Publication Data

US 2022/0050952 A1    Feb. 17, 2022

Related U.S. Application Data

(60) Provisional application No. 63/066,556, filed on Aug. 17, 2020.

(51) Int. Cl.
| | |
|---|---|
| G06F 30/00 | (2020.01) |
| G06F 30/3953 | (2020.01) |
| G06F 30/398 | (2020.01) |
| G06F 30/392 | (2020.01) |
| G06F 119/06 | (2020.01) |

(52) U.S. Cl.
CPC ........ *G06F 30/3953* (2020.01); *G06F 30/392* (2020.01); *G06F 30/398* (2020.01); *G06F 2119/06* (2020.01)

(58) Field of Classification Search
CPC .. G06F 30/3953; G06F 30/392; G06F 30/398; G06F 2119/06; G05F 1/561
See application file for complete search history.

(56) References Cited

U.S. PATENT DOCUMENTS

| | | | | |
|---|---|---|---|---|
| 6,202,191 | B1 * | 3/2001 | Filippi | H01L 23/53223 |
| | | | | 257/E23.153 |
| 6,581,201 | B2 * | 6/2003 | Cano | G06F 30/39 |
| | | | | 716/120 |
| 7,225,418 | B2 * | 5/2007 | Shimazaki | G06F 30/33 |
| | | | | 716/113 |
| 7,272,810 | B2 * | 9/2007 | Orita | G06F 30/394 |
| | | | | 716/120 |
| 7,462,941 | B2 * | 12/2008 | Campbell | H01L 23/5286 |
| | | | | 257/784 |
| 7,836,415 | B2 * | 11/2010 | Ushiyama | G06F 30/20 |
| | | | | 716/113 |
| 7,872,355 | B2 * | 1/2011 | Owa | H01L 23/5286 |
| | | | | 257/734 |

(Continued)

FOREIGN PATENT DOCUMENTS

JP        2019536285 A   * 12/2019

*Primary Examiner* — Naum Levin
(74) *Attorney, Agent, or Firm* — Weaver Austin Villeneuve & Sampson LLP

(57) ABSTRACT

A method and system for guided power grid augmentation determines a minimum resistance path for cells within an integrated circuit (IC) design. The minimum resistance path traces a conducting wire connecting a pin of a cell to an IC tap within the IC design. A voltage drop value for each of the cells is determined so as to identify target cells having a voltage drop value that satisfies a voltage drop criteria. Polygons have defined size characteristics are defined around the minimum resistance paths of the target cells, and conductors, such as additional conductors, are generated within the defined polygons.

20 Claims, 14 Drawing Sheets

(56) References Cited

U.S. PATENT DOCUMENTS

| | | | | |
|---|---|---|---|---|
| 8,336,018 B2* | 12/2012 | Turner | ............... | H01L 23/5286 |
| | | | | 716/133 |
| 8,386,987 B1* | 2/2013 | Gosti | ..................... | G06F 30/30 |
| | | | | 716/120 |
| 8,495,547 B2* | 7/2013 | Keinert | ................ | G06F 30/394 |
| | | | | 716/120 |
| 8,712,752 B2* | 4/2014 | Lau | .................... | G06F 30/3312 |
| | | | | 716/108 |
| 8,959,470 B2* | 2/2015 | Patel | .................... | G06F 30/392 |
| | | | | 716/118 |
| 9,141,753 B2* | 9/2015 | Rozen | .................. | G06F 30/392 |
| 10,185,801 B2* | 1/2019 | Vedantam | ............ | G06F 30/394 |
| 11,531,797 B1* | 12/2022 | Gao | .................... | G06F 30/3312 |
| 2006/0095881 A1* | 5/2006 | Kwon | .................... | G06F 30/39 |
| | | | | 716/139 |

* cited by examiner

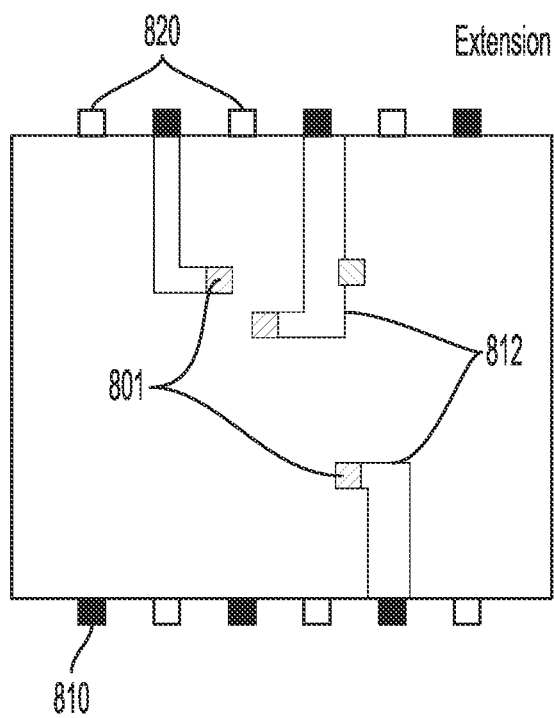
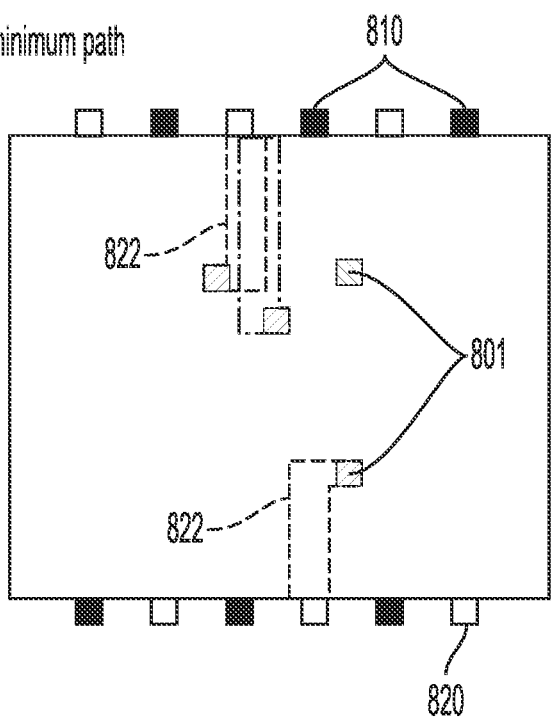
FIG. 9A
FIG. 9B

GUIDED POWER GRID AUGMENTATION SYSTEM AND METHOD

CROSS-REFERENCE TO RELATED APPLICATIONS

This patent application claims priority to U.S. Provisional Application Ser. No. 63/066,556, filed Aug. 17, 2020, which is incorporated herein by reference in its entirety.

TECHNICAL FIELD

This disclosure generally relates to an electronic design automation (EDA) system. In particular, the present disclosure relates to a system and method for providing guided power grid augmentation.

BACKGROUND

For a very large scale integration (VLSI) design, an external voltage source commonly referred to as a tap supplies current for the entire integrated circuit (IC) chip. Power grid networks provide power from the tap to various cells, however these power grid networks may be characterized by voltage drop effects as power is provided through the wires of the power grid. The voltage drop may impact the speed of switching gates and may cause a cell to fail to meet timing constraints.

There are other factors that may lead to voltage drop problems. For example, an input vector of a physical design. Standard cells placed on the same power rail may draw current at the same time to increase peak current. Standard cell positioning may result in voltage drop problems as well, as cells with high peak current values placed on the same power rail or neighboring power rails could lead to voltage drop problems when drawing current simultaneously. Clock tree structures of certain IC designs can result in voltage drop problems. A design with sequential cells will synthesize clock trees in design. Usually, clock trees have been provided with buffers and/or inverters. The structure of clock trees determined the moment to switch sequential cells and combinational cells connected to sequential cell. As another example, weaknesses within a power grid design itself may increase voltage drop problems, as voltage drop increases with inefficient power grid routing.

SUMMARY

Certain embodiments are directed to a method including: determining a minimum resistance path for cells of an integrated circuit (IC) design to connect a cell to a respective IC tap within the IC design; determining a voltage drop value for each of the plurality of cells; identifying a plurality of target cells selected from the plurality of cells, wherein the voltage drop value of each of the plurality of target cells satisfy one or more voltage drop criteria; defining polygons surrounding each minimum resistance path of the target cells; and generating conductors within the polygons.

In certain embodiments, the identification of the minimum resistance path locations for each of the plurality of cells includes an identification of portions of a power grid network within the minimum resistance path for each of the cells. In certain embodiments, identifying target cells includes: comparing IR-drop characteristics of each of the cells against the IR-drop criteria; and identifying the target cells as cells having IR-drop characteristics satisfying the one or more IR-drop criteria. In certain embodiments, the one or more IR-drop criteria includes a maximum number of target cells. In various embodiments, the one or more IR-drop criteria includes a minimum IR-drop value. In various embodiments, the method further includes generating one or more vias to connect conductors with shapes of the power grid layout. In certain embodiments, executing IR-drop analysis for each of the cells includes executing the IR-drop analysis for each connecting pin of each cell. In various embodiments, the identification of minimum resistance path locations for connecting each of the cells to an IC tap includes identifying the minimum resistance path extending between a pin to an IC tap. In certain embodiments, the identification of minimum resistance path locations for connecting each of the cells to an IC tap includes identifying a minimum resistance path location for connecting each of the cells to a power IC tap and identifying a minimum resistance path location for connecting each of the cells to a ground IC tap. In various embodiments, defining polygons surrounding the minimum resistance path locations corresponding with each of the target cells includes defining at least one polygon including a plurality of target cells within boundaries of the at least one polygon. Moreover, the method may further include: after defining polygons surrounding the minimum resistance path locations corresponding with each of the target cells, identifying one or more areas included within overlapping polygons; redefining at least one polygon to replace the overlapping polygons and to surround at least the area included within the overlapping polygons; and generating conductors within the redefined at least one polygon. In certain embodiments, the method further includes, after generating the conductors, routing at least one wire in a region of the IC design outside of the polygons.

Various embodiments are directed to a computer-readable medium, including at least one non-transitory computer storage medium for storing instructions that, when executed by an apparatus, cause the apparatus to: determine a minimum resistance path for cells of an integrated circuit (IC) design to connect a cell to a respective IC tap within the IC design; determine a voltage drop value for each of the cells; identify target cells having a voltage drop value that satisfies voltage drop criteria; define polygons surrounding each minimum resistance path of the target cells; and generate conductors within the polygons.

In certain embodiments, identifying target cells includes: comparing IR-drop characteristics of each of the cells against the one or more IR-drop criteria; and identifying the target cells as cells having IR-drop characteristics satisfying the IR-drop criteria. In certain embodiments, the identification of minimum resistance path locations for connecting each of the cells to an IC tap includes identifying the minimum resistance path extending between a pin to an IC tap. In various embodiments, the identification of minimum resistance path locations for connecting each of the cells to an IC tap includes identifying a minimum resistance path location for connecting each of the cells to a power IC tap and identifying a minimum resistance path location for connecting each of the cells to a ground IC tap. In various embodiments, defining polygons surrounding the minimum resistance path locations corresponding with each of the target cells includes defining at least one polygon including multiple target cells within boundaries of the at least one polygon. In certain embodiments, the at least one non-transitory computer storage medium for storing instructions that, when executed by an apparatus, further cause the apparatus to: after generating polygons surrounding the minimum resistance path locations corresponding with each of the target cells, identify areas included within overlapping polygons; redefine at least one polygon to replace the overlapping polygons and to surround at least the area included within the overlapping polygons; and generate conductors within the redefined at least one polygon. In certain embodiments, at least one non-transitory computer storage medium for storing instructions that, when executed by an apparatus, further cause the apparatus to route at least one wire in a region of the IC design outside of the polygons after generating the conductors.

Certain embodiments are directed to an apparatus including a memory storing instructions and a processor coupled with the memory and to execute the instructions. The instructions, when executed, cause the processor to: determine a minimum resistance path for cells of an integrated circuit (IC) design to connect a cell to a respective IC tap within the IC design; determine a voltage drop value for each of the cells; identify target cells having a voltage drop value that satisfies voltage drop criteria; define polygons surrounding each minimum resistance path corresponding with each of the target cells; and generate conductors within the polygons.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIG. 9A illustrates the location of polygons drawn around minimum resistance paths identified in FIG. 8B;

FIG. 9B illustrates the location of polygons drawn around minimum resistance paths identified in FIG. 8C;

DETAILED DESCRIPTION

Figure 1:
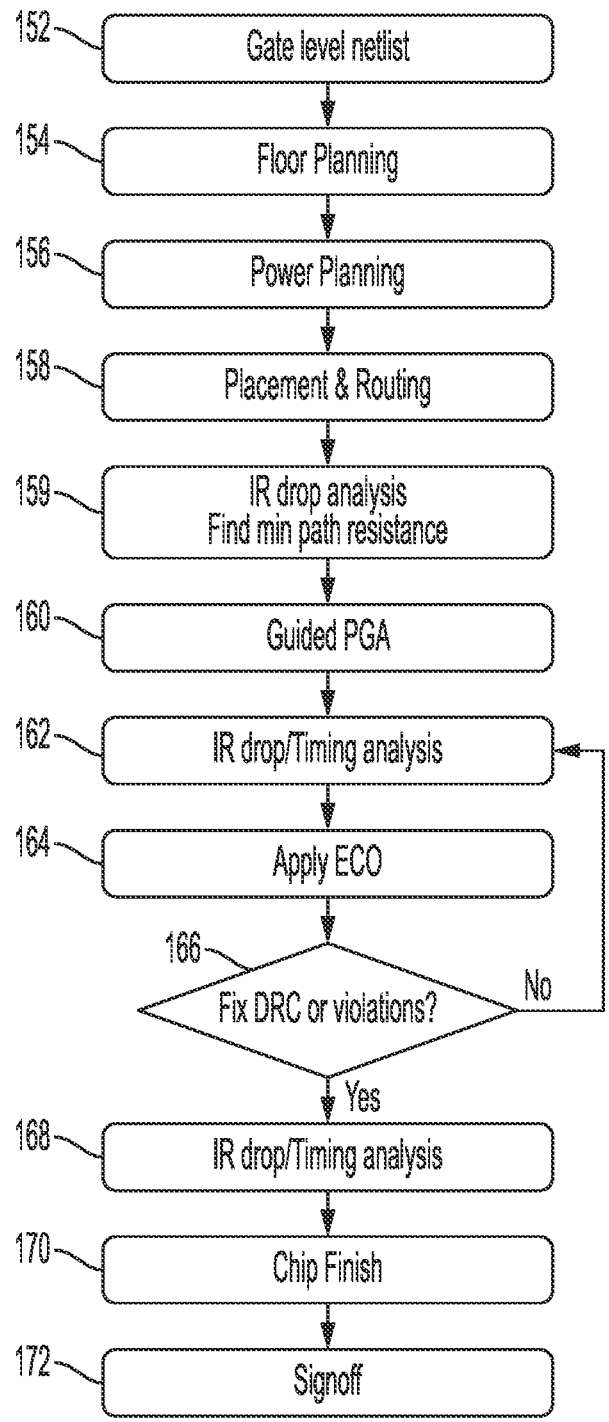
FIG. 1 shows an example guided PGA process flow according to one embodiment.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

As used herein, the terms noted below have the following meaning.

Power grid data defines characteristics of an IC design, including an indication of a power grid layout for multiple cells included within the IC design. The Power grid data can include additional data indicative of characteristics of the IC design, including cell types for each cell within the IC design, cell locations for each cell within the IC design, the location of power taps and ground taps for the IC design, the location of conducting wires connecting the cells with a power tap and/or a ground tap, as well as other characteristics of the IC design. The location of the conducting wires can reflect the minimum resistance path between each cell and the respective taps, which is a pathway identified as having the least resistance for connecting the cell with the respective tap (e.g., other pathways, such as longer conducting wire pathways, alternative locations for at least a portion of a connecting wire, etc. are characterized as having higher resistance values). The power grid data can include other data utilized by a systems and methods for design of an IC design. Moreover, once a guided PGA process as described herein is performed, the power grid data can include the location, size, shape, material type, location of vias for connecting with conductors of a power grid, and other characteristics of conductors added to the IC design.

IR-drop analysis (also referred to herein as voltage drop analysis) refers to an analysis framework for analyzing the voltage drop of the power and ground network. An IR-drop analysis can be performed for a specific cell within an IC design or for all cells within an IC design. More specifically, individual cells within an IC generally include multiple pins (e.g., input pins, output pins, power pins, etc.), and therefore the IR drop for a cell can be analyzed for individual power and ground pins of a cell.

Static IR-drop analysis refers to an analysis framework for analyzing the voltage drop of the power and ground network without the effect of capacitance.

Dynamic IR-drop analysis refers to an analysis framework for analyzing the voltage drop of the power and ground network with a current wave form of each cell.

A power grid shape refers to a segment of a power grid wire, such as a power grid wire connecting a power pin of a cell to a power tap of the IC as a part of the power grid network.

A minimum path resistance refers to a path to a tap along a power grid network that has the minimum resistance value as compared with other possible paths for laying out conducting wire between a cell and a respective tap within the power grid network, as identified by relevant IC design systems.

A design rule check (DRC) refers to an analysis framework for ensuring that foundry dependent design rules are satisfied for a design. When a design undergoes a number of failures to pass a design rule, the design will have a lower yield rate of the physical IC chip.

A total negative slack (TNS) refers to the summation of all negative slack within a cell. Generally, slack within a cell is indicative of potential timing violations within a cell, and slack may refer to either setup slack or hold slack. Setup slack refers to timing violations occurring when data arrives before it is required, and can be characterized by subtracting the data arrival time from the data required time. Hold slack refers to timing violations occurring when data arrives after it is required, and can be characterized by subtracting the data required time from the data arrival time.

A worst negative slack (WNS) refers to the lowest negative slack value of a cell.

A row site refers to an IC design's core area having rows to simplify the complexity of cell placement. Each row includes several sites. A row site is the basic unit of a standard cell width. Row-site height is the basic unit of standard cell height.

Providing power grid augmentation (PGA) for select cells (such as for select pins of those select cells) within an IC chip entails augmenting the conductive wires defining the minimum resistance paths defined within the IC design by adding additional conducting wires, traces, deposits, or other conductors within one or more layers of the IC design, and connecting these additional conductors with one or more of the conductive wires of the minimum resistance paths of the defined power grid. Providing PGA for select cells results in improved performance by minimizing IR drop along wires and shapes within the IC chip design for those cells demonstrating severe IR drop characteristics, while minimizing coupling capacitance that could otherwise hinder IC performance. After routing of a power grid, the IC design is subject to an IR drop analysis for multiple cells within the design. Those cells satisfying defined IR drop criteria are selected for PGA by providing additional conductive pathways within selectively widened shapes/regions and/or wires within the IC design to decrease resistance. Since the PGA is applied on specific regions, the result is fewer PGA shapes and routing areas, which minimizes the effect of coupling capacitance on signal nets within the IC design. Moreover, guided PGA processes can be further refined to be applied within specific layers of a IC design, thereby further decreasing undesirable effects of coupling capacitance between wires in adjacent layers.

For a VLSI design, wires provided between the tap and certain cells (connecting the power tap with power pins of the cells or connecting the ground tap with ground pins of the cells) are characterized by resistance that results in a voltage drop effect as current is provided from the tap to those certain cells via a power distribution network. During an initial design process, the power grid structure is planned based at least in part on power dissipation and power density of the physical design. Even with carefully planned power grid layouts, the power grid may still be characterized by voltage drop problems. If there are cells of the power grid that still have IR drop problems, various engineering change orders (ECOs) may be applied to the chip design to ensure that all cells within the IC design meet applicable IR drop and timing constraints.

For example, ECOs may encompass power grid augmentation (PGA) to create power grid shapes to connect in parallel to the existing power grid to reduce the effective resistance of a segment shape. PGA is executed after routing the power grid. PGA creates power grid shapes in non-routed areas of the IC design and connects the created power grid shapes to the existing power distribution network to reduce the effective resistance of segment power grid shapes.

Typical PGA implementations generally create power grid shapes on all empty areas of a physical design to provide improved IR drop characteristics. However, the side effect of such a PGA implementation is an increased effect of coupling capacitance to signal nets as there are significantly more conductive shapes within the IC design, which causes slack on signal pins.

As discussed herein, a guided PGA process augments power grid shapes by providing additional conductors within regions of the IC design around those areas characterized by high levels of IR voltage drop. Since the guided PGA only augments power grid shapes on specific regions, the resulting IC design has relatively low levels of power grid shapes and routing areas. The effect of coupling capacitance on signal nets is decreased. Moreover, the guided PGA process provides increased routing resources (areas where additional routing wires can be placed because those areas are not occupied by augmenting power grid shapes) in areas characterized by high levels of IR voltage drop, without addressing IR drop in areas of the IC design that are not otherwise characterized by severe IR drop. Based on example criteria for applying guided PGA, the total power grid shape area of the guided PGA may encompass between about 15% to 40% of the power grid shape area that would be provided on an identical IC design subject to general PCA routing.

FIG. 1A-1B shows an example guided PGA flow.

In the illustrated flowchart of FIG. 1, the guided PGA process of a VLSI design process encompasses gate level netlist planning (as indicated at 152), floor planning as indicated at 154), power planning (as indicated at 156), and placement and routing (as indicated at 158) (typically performed by an IC designer planning a power grid structure in a power planning stage based on power dissipation and power density of the physical design). The power grid network may be divided into three shape types distinguished based on layer positioning and wire width: power ring, power stripe, or power rail. However, a power grid network typically has voltage drop problems even with estimation methods utilized to model and design the power grid structure to minimize voltage drop, and therefore a voltage drop analysis is performed as indicated at 159 to identify voltage drop values associated with individual cells within the IC design, and a minimum resistance path is identified for the cells for connecting those cells to respective power taps and/or ground taps (specifically, for drawing a pathway for a conducting power grid wire extending from a pin of the cell to the respective power tap or ground tap). A guided PGA process is provided to generate PGA shapes within specific areas of the IC design characterized by high levels of IR-drop, as reflected at 160.

After the illustrated placement and routing stage of the guided PGA process, an IR drop/timing analysis is executed to ensure functionality as reflected at 162 for the present guided PGA process. The analysis also confirms that IR drop of all standard cells is less than a voltage drop threshold (or satisfying another IR-drop related criterion). The voltage drop threshold may be determined manually for example implementations, such as between 10% to 15% of supply voltage.

If there are cells that still have IR drop problems, one or more additional ECO changes may be applied on a chip design (as reflected at 164). DRC can be performed and any DRC violations are fixed, as reflected at block 166, before iterating back to performing voltage drop and timing violation analysis at 162. This process of iterating through the voltage drop and timing analysis, ECO application, and DRC analysis and remediation is iterated until it meets IR drop and timing constraints. Such ECO changes result in changes to a physical design to fix design violations (e.g., DRC, IR drop, timing, and/or the like). Examples of ECO processes include:

Buffer insertion—to insert buffer cells for high-fanout cells and reduce peak current of a driver cell in a signal net.

Cell relocation—relocating a cell to a place within the IC design characterized by lower IR drop.

Cell sizing—resizing cells to low power, peak current while maintaining current timing.

Change routing layer—modify wire length to avoid high coupling effects and shift arrival time of signals for one or more cells to avoid simultaneous current draws.

Power grid network modification (2 types)—overdesigning power grid structures to significantly reduce IR drop. Such power grid network modification also reduces routing resources for a router to fix DRC and pass timing constraints. Therefore, certain implementations may remove power grid shapes on a specific area of an IC design with no IR drop or no timing issues. As a second option for power grid network modification, power grid structures are estimated based on the power density and power dissipation of physical designs. If a physical design continues to have IR drop problems, power grid shapes may be widened to increase the width of the power grid shapes (a resistance value is inversely proportional to the width of the IR shapes) or by creating power grid shapes to parallelly connect to the existing power grid to reduce the effective resistance of the segment shape. However, regardless of whether existing power grid shapes are widened or new power grid shapes are added in parallel, the result of such power grid network modifications is an increase in coupling capacitance among wires. If the capacitance of a wire increases, delays associated with signal pins connected to the wire will also increase.

As reflected within the final blocks of FIG. 1, an IC design process is ultimately completed by receiving input indicative of a final verification of the design and other steps associated with chip finishing (reflected at 170) and signoff processes encompassing approval of the design to proceed to fabrication processes (as reflected at 172).

PGA is a method of addressing IR-drop problems by addressing power grid weaknesses. PGA is executed after routing a power grid. Since the power distribution network of a physical design is difficult to modify as a part of post-routing processes, PGA processes create power grid shapes in non-routed areas of the IC design and connects those newly introduced power grid shapes to an existing power distribution network, as shown in the example of FIG. 2 to reduce the effective resistance of segment power grid shapes.

Figure 2:
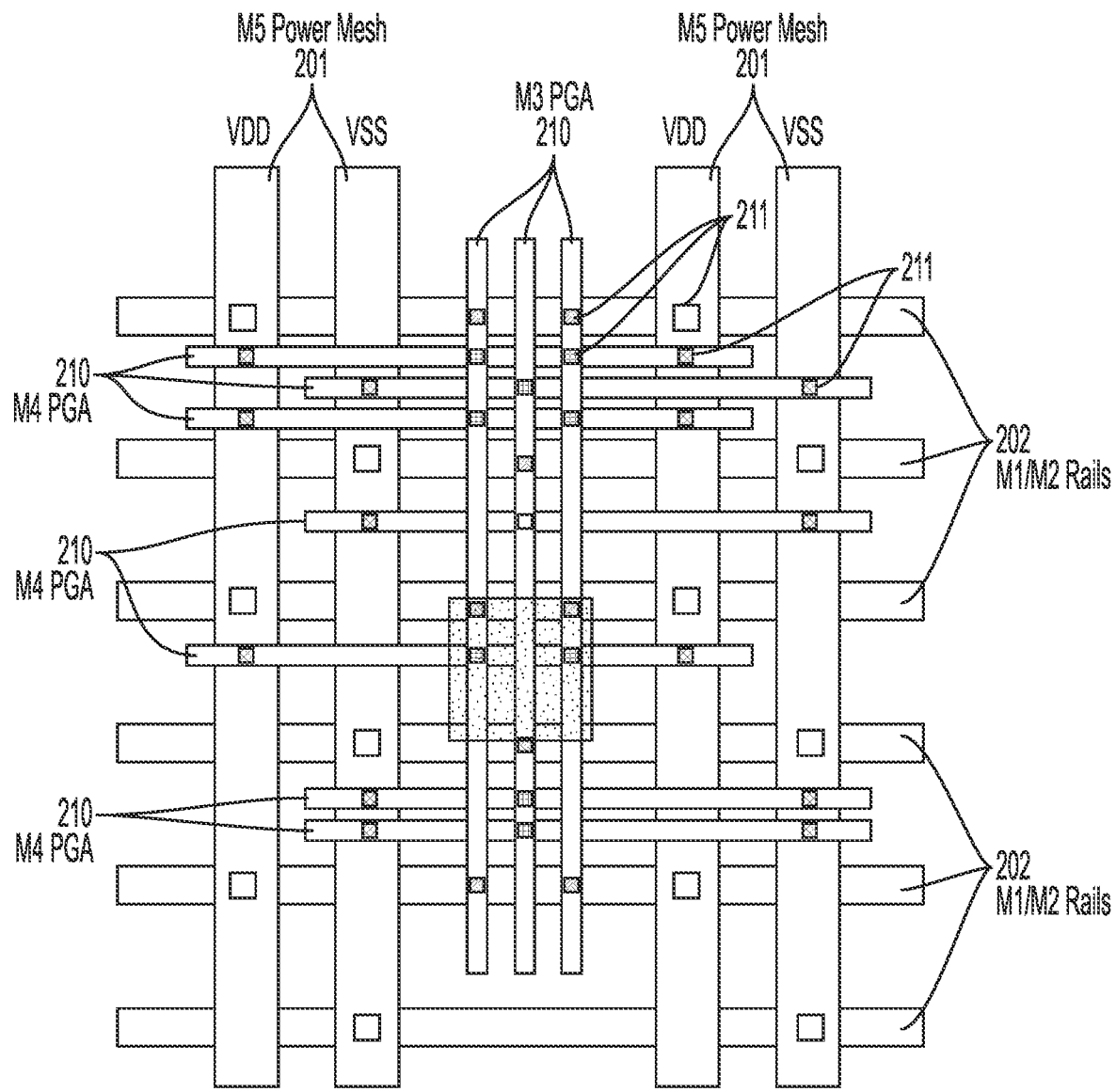
FIG. 2 is an illustration of a power grid in accordance with one embodiment.

As shown in the schematic illustration of a small portion of a power grid of FIG. 2, existing power grid shapes (segments of wires extending along minimum resistant paths between cells and taps are labeled as the power mesh 201 and rails 202) often define relatively large spaces between adjacent wires of the power grid (as reflected in FIG. 2, the spaces between wires of the power grid may be larger than the width of the wires defining the power grid itself) are augmented by PGA-provided power grid shapes—additional conductors 210 added into the spaces between adjacent wires of the power grid—running in parallel with the wires of the power grid (the additional conductors 210 added as a part of the PGA process are labeled as PGA in the figure). As a result, the PGA shapes provide a parallel conductive pathway for signals between a tap and power pins of individual cells of the IC. Those PGA shapes are conductively connected with the power mesh and rail shapes with vias 211 that may extend between adjacent layers of the IC design (those vias 211 are shown where multiple conductors overlap in the illustration of FIG. 2).

Typical PGA processes do not specifically consider IR drop distribution within the IC design. Instead, such PGA processes create power grid shapes on all empty areas of a physical design to decrease overall IR drop of the entire IC physical design.

Filling all empty spaces on a physical design may improve IR drop problems within the IC design. However, the side effect of general, non-targeted PGA increases the effect of coupling capacitance to signal nets and causes worsened slack on signal pins within the IC design. The coupling capacitance effect means that the placement of two or more wires near each other increases a capacitance value of the wires. In addition, by filling all empty space within an IC design with conductive power grid shapes, the resulting IC design has negligible space remaining for routing other wires/resources, which may be necessary in certain design processes to perform additional corrections to address other IC design problems.

Figure 3:
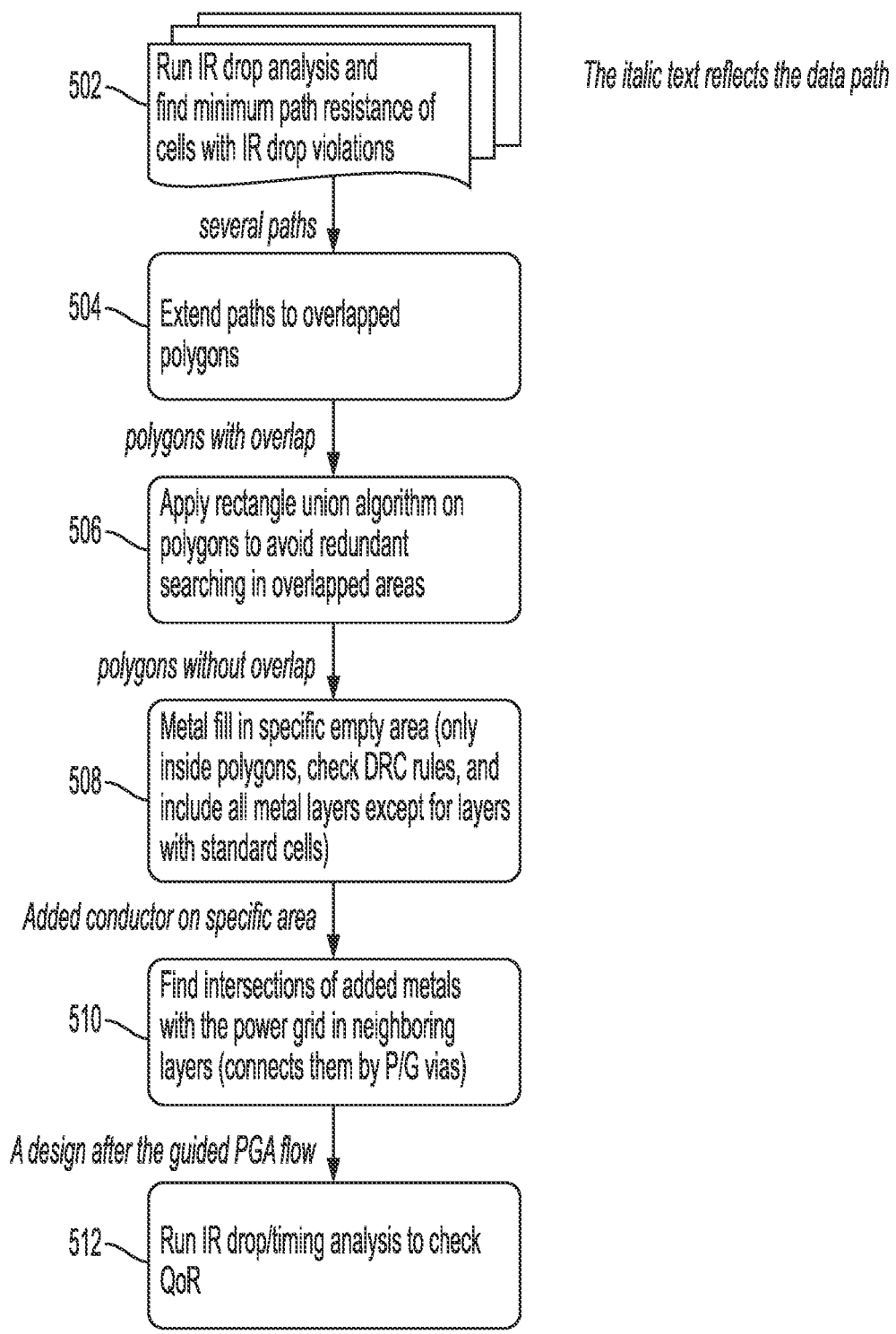
FIG. 3 is a flowchart showing an example process for providing guided PGA in accordance with one embodiment.

FIG. 3 is a flowchart showing an example process for providing guided PGA. Guided PGA processes apply PGA to specific, targeted regions of a physical IC design, as reflected in FIG. 1. The guided PGA process provides an efficient way to perform PGA in specific regions of a physical IC design. By providing fewer augmenting power grid shapes to the physical IC design than a typical PGA process, the guided PGA process provides an increased quality of result relating to better IR-drop distribution, better TNS and better WNS for the IC design. Before executing the guided PGA, the process includes steps for executing an IR drop analysis (static and/or dynamic analysis) to calculate a voltage drop value for each cell within the IC design and for finding a minimum path resistance for connecting each cell to a power tap and/or ground tap (as reflected at 502 of FIG. 3). Specifically, finding the minimum path resistance for each cell encompasses an identification of the location of conducting wires to be placed within the IC design and extending from a pin of a particular cell to a tap within the IC design. Identifying the minimum path resistance can be an iterative process, according to which a conducting wires are laid out in an initial configuration after placement of the cells for an IC design (e.g., which may be an automated process according to certain IC design configurations), and resistance values are determined for each conducting path within the IC design. The process for laying out conducting wires can be repeated for a different conducting wire layout and resistance values can be determined for the new conducting wire layout. This process can be iterated until all possible conducting wire layouts are generated, and a layout is selected to continue the IC design process. The selected layout satisfies layout criteria, such as having the lowest average resistance for all conducting wire paths, having the lowest resistance value for a specific conducting wire path, or other criteria as is relevant for a particular IC design. The output of such an analysis is an IR drop value associated with each cell within an IC design (specifically, at each power input pin of each cell within the IC design), and physical indications of the locations of minimum path resistances for the cells. The output of this analysis is utilized to identify specific target cells characterized as having high IR-drop values, and the minimum resistance paths are utilized for locating PGA shapes (either widening the existing minimum path resistance or providing shapes in parallel thereto). The result is the availability of additional routing resources (e.g., open space) on the IC design that are not occupied by PGA shapes while maintaining low levels of IR-drop. Because fewer PGA shapes are formed as a result of the guided PGA process as compared with a typical PGA process, the resulting IC design has a significant improvement on timing quality by reducing a coupling capacitance effect on wires.

FIG. 3 provides additional detail regarding the guided PGA flow. After determining appropriate locations for providing metal fill in accordance with the guided PGA flow, metal is deposited to form the shapes corresponding with the guided PGA flow in the IC design within all metal layers or specified metal layers. The guided PGA flow is a DRC-clean method that checks foundry-specific DRC rules to ensure the guided PGA flow remains in compliance with applicable DRC rules. When depositing metal in accordance with PGA flow-identified locations, the PGA flow connects the additional metal with existing power grid shapes with vias. Thereafter, an additional IR drop/timing analysis can be executed to determine the quality of result of the design.

As a part of the guided PGA flow, there are two steps for executing power grid augmentation: providing metal fill within empty areas of the IC design in accordance with determined guided PGA locations and identifying intersections with the existing power grid in neighboring layers. Providing metal fill within empty areas of the IC design encompasses mapping the location for placement of additional conductors, such as wires or other conducting shapes, within certain areas of the IC design. The additional conductors can then be connected with existing power grid shapes (e.g., wires mapped along minimum resistance paths between cells and taps) with vias extending between adjacent layers of the IC design. The vias encompass conducting components that electrically connect the augmenting conducting shapes with the power grid shapes defined along the located minimum resistance paths.

Figure 4A:
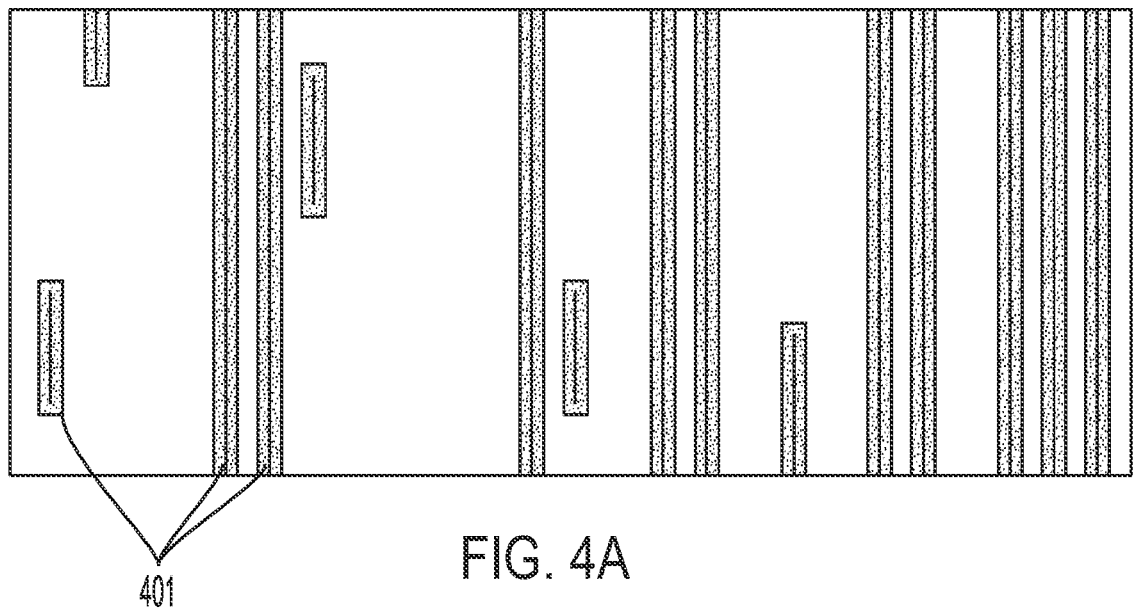
FIG. 4A shows locations of power grid shapes of an example IC design.
Figure 4B:
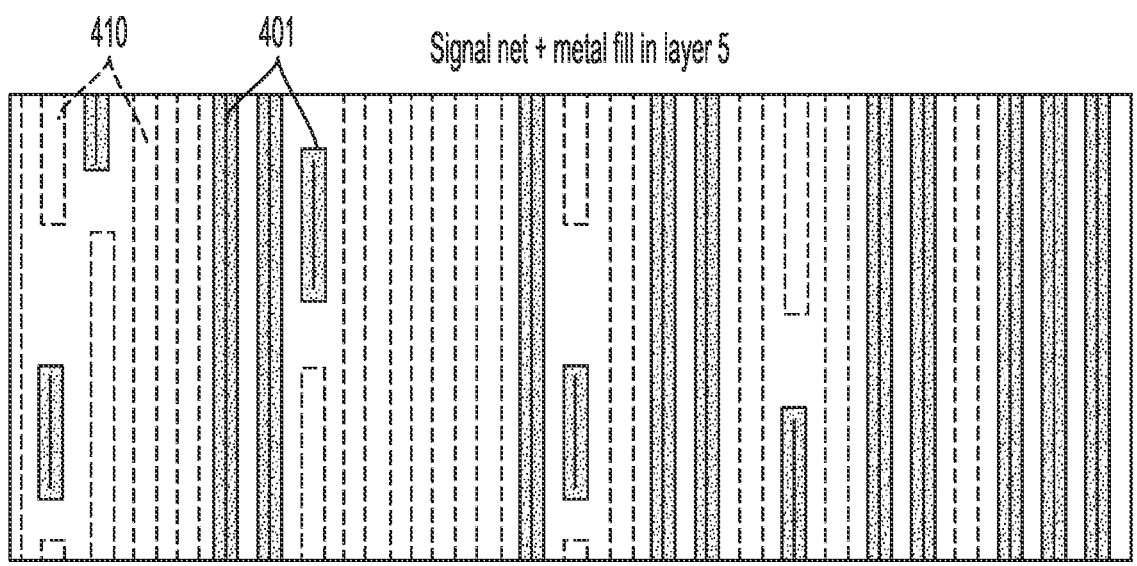
FIG. 4B shows locations of conductors provided as metal fill shapes between the power grid shapes shown in FIG. 4A.

FIGS. 4A-4B illustrate an example process for filling empty areas of an IC design with conductors 410 (e.g., shaped as wires, filled areas, and/or other conductive shapes) as a part of a PGA process. FIG. 4A illustrates minimum resistance paths 401 of a cell that were laid out during the IC design process for a specific layer (FIG. 4A illustrates a small portion of an overall IC design) and FIG. 4B illustrates metal-fill added around the existing minimum resistance paths 401 as conductors 410. Although substantially all of the empty space surrounding the power grid shapes is filled with conductors 410 in the illustration of FIG. 4B, it should be understood FIG. 4B illustrates only a small portion of an IC design and that in other, unillustrated portions of the IC design, certain areas around the power grid shapes (e.g., around power grid shapes in areas not characterized by high levels of IR-drop) may not be filled with conductors 410 in accordance with a guided PGA process.

Figure 5A:
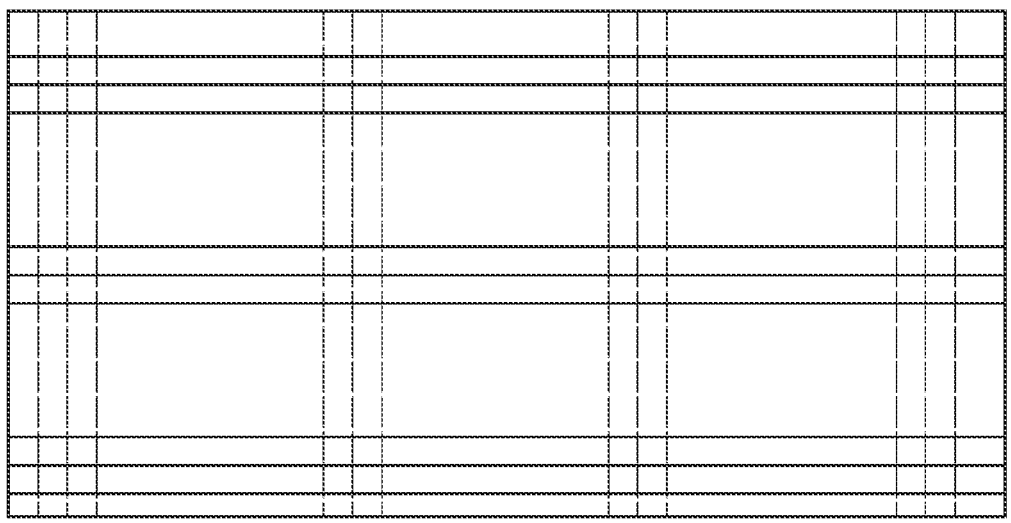
FIG. 5A shows a power grid of an example IC design.
Figure 5B:
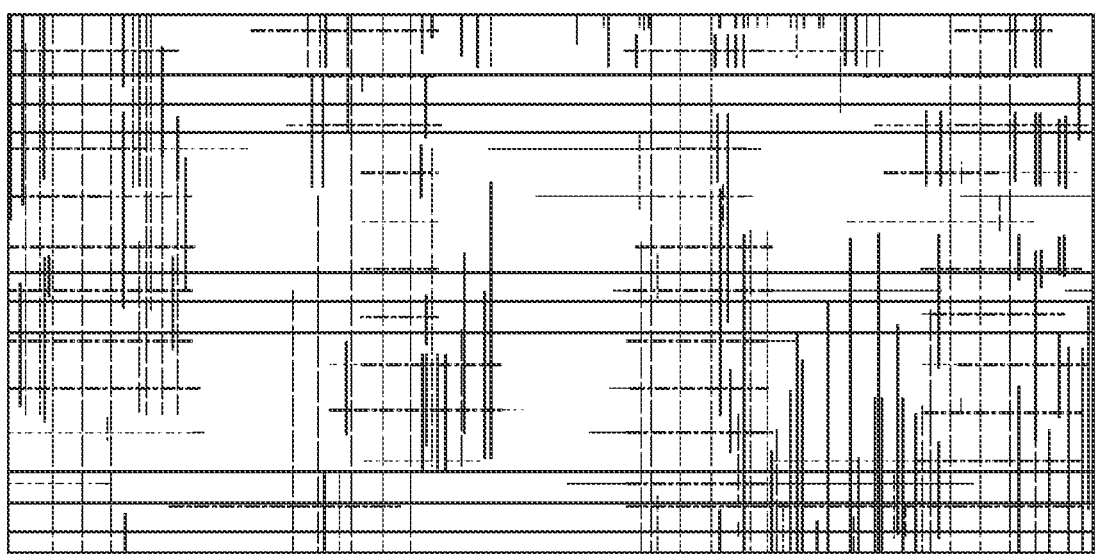
FIG. 5B shows connections of PGA shapes provided and connected with the power grid of FIG. 5A.
Figure 6:
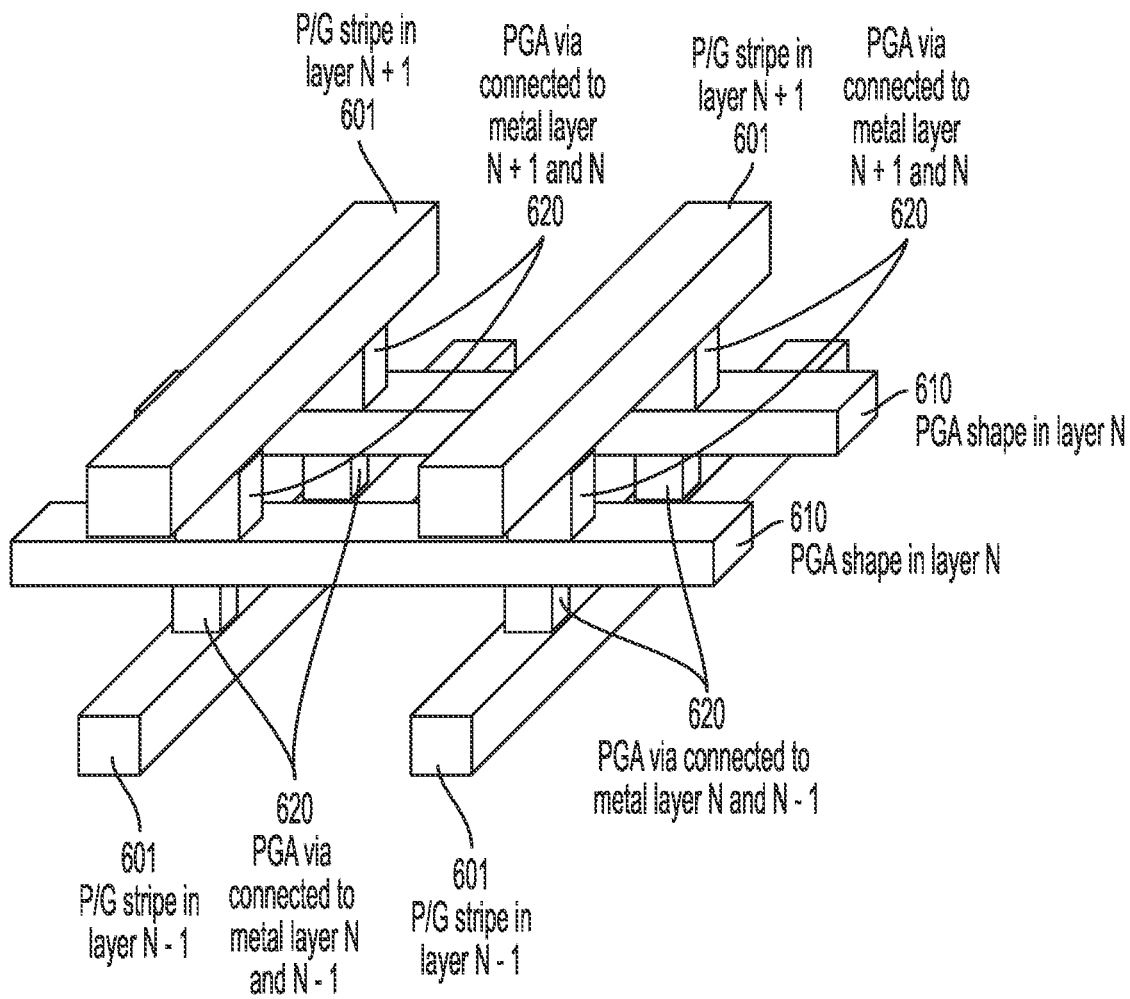
FIG. 6 is a three-dimensional schematic illustration of connections between power grid shapes in adjacent layers.

When adding the PGA shapes as discussed in reference to FIGS. 4A-4B, those PGA shapes are connected to existing power grid shapes and/or to other PGA shapes by power grid vias if there are any identified intersections within neighboring layers as shown in FIGS. 5A-5B (the existing power grid shapes illustrated as lines provided in a predictable grid pattern as reflected in FIG. 5A and the PGA shapes reflecting the other lines added in the representation of FIG. 5B) and FIG. 6. FIG. 5A illustrates a power grid before any PGA processes have been applied, and FIG. 5B illustrates the same power grid after providing PGA processes in multiple layers of the power grid (FIGS. 5A-5B illustrate a small portion of an IC design that is subject to guided PGA). FIG. 6 provides a three-dimensional representation of connections between power grid (P/G) shapes 601 and PGA conductors 610 within adjacent layers using vias 620.

Figure 7A:
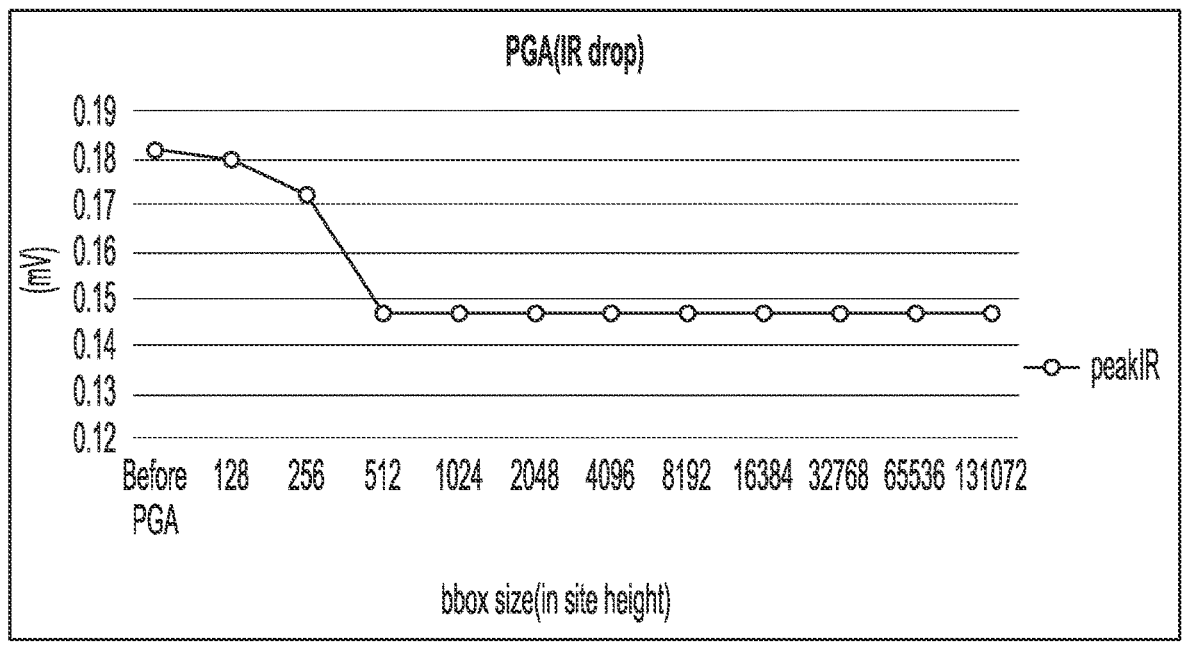
FIG. 7A illustrates the effect of IR-drop as a function of distance for PGA shapes.
Figure 7B:
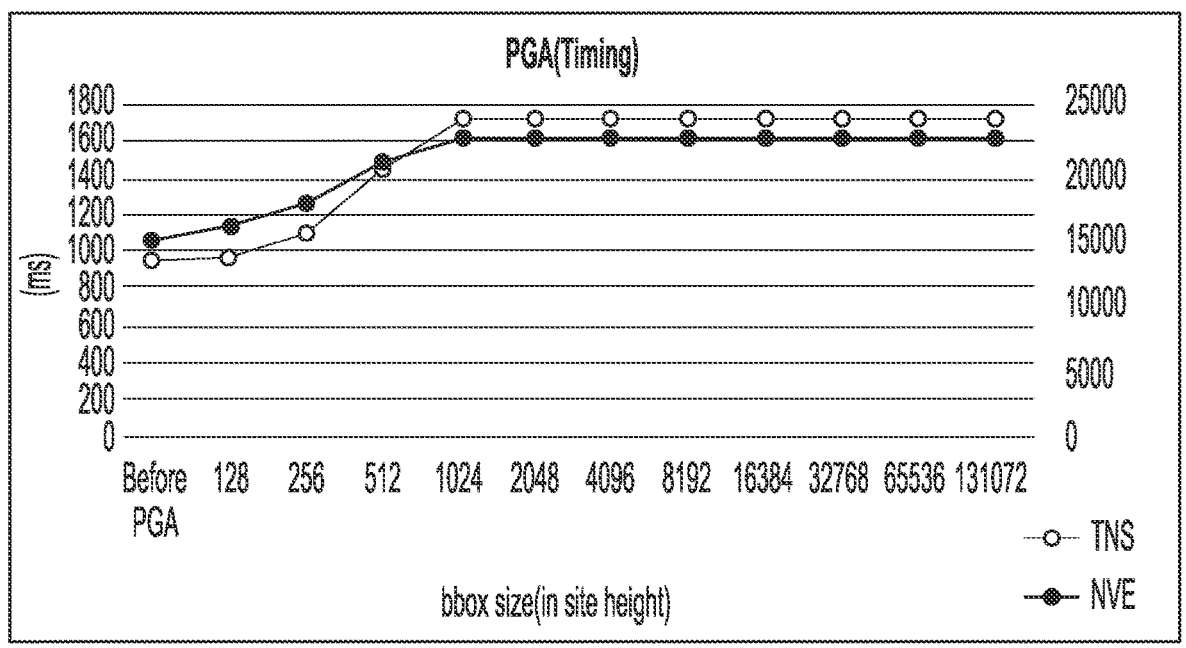
FIG. 7B illustrates the effect of timing as a function of distance for PGA shapes.

To enable guided PGA so as to provide PGA-generated shapes at specified locations within an IC design (e.g., locations corresponding to specific cells within the IC design), IR drop and timing effects of a specific areas within a cell are determined. FIGS. 7A-7B illustrate the effect of varying the size of the bounding box within which PGA shapes are applied and illustrate that a larger area of conductors correlates to a lower quantity of IR drop violations, but worse timing. FIGS. 7A-7B illustrate the x-direction and y-direction distances away from a minimum path resistance location for a particular cell for providing PGA shapes, and provide an indication of IR-drop and timing effects of providing those PGA shapes. These results demonstrate that providing a balanced and targeted placement of PGA shapes provides optimal IR-drop effects while minimizing the effects of coupling capacitance.

Guided PGA systems and methods identify optimal locations within an IC design for applying PGA based at least in part on the IR-drop analysis and determined locations of the minimum resistance path locations for each of the cells within the IC design. As discussed herein, PGA shapes are utilized to augment the power grid shapes within neighboring regions surrounding at least a portion of the cell power grid characterized as having high IR drop violations. These areas having high IR drop violations may be characterized as areas having high resistance values.

Upon identifying areas within the IC design for applying PGA shapes, the guided PGA process generates PGA shapes within those identified areas. Since a physical design might have several independent hot spots distributed in the core area, the guided PGA process identifies one or more cells characterized as having the worst IR-drop characteristics within the IC design. Those cells identified as having the worst IR-drop characteristics may be identified based on any of a variety of criteria, such as satisfying a threshold resistance value, being within a defined number of cells (or a defined percentage of cells, identified at the cell-level or the more specific pin-level, such as a defined number of pins or a defined percentage of pins) having the worst IR-drop characteristics satisfying a threshold (e.g., the top 10 worst IR-drop cells; the top 10% worst IR-drop cells), and/or the like.

Figures 8A, 8B, 8C:
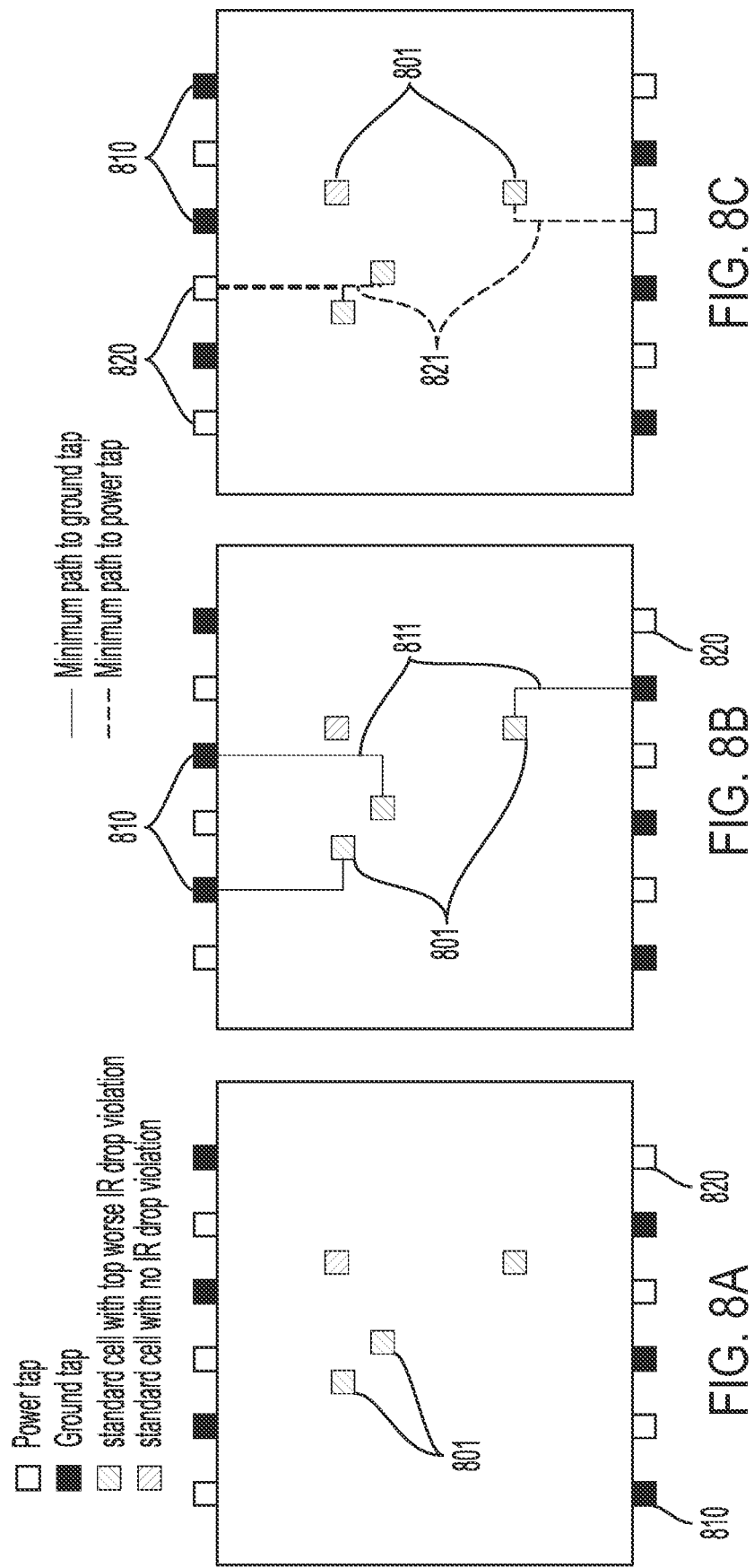
FIG. 8A illustrates the location of specific cells within an IC-design characterized as having large IR-drop characteristics.
FIG. 8B illustrates minimum resistance paths between the specific cells identified in FIG. 8A and corresponding ground taps.
FIG. 8C illustrates minimum resistance paths between the specific cells identified in FIG. 8A and corresponding power taps.

For cells identified as candidates for guided PGA processes, the process includes steps for identifying the corresponding minimum resistance path for those cells (including data indicating the location of the minimum resistance path). An example of such a configuration is shown in FIGS. 8A-8C. The method identifies cells 801 having identified worst IR-drop characteristics (FIG. 8A and as reflected at 502 of FIG. 3), and identifies paths 811 extending from the identified worst-performing IR-drop cells 801 within an IC design to ground taps 810 (FIG. 8B) and paths 821 extending from the identified worst-performing IR-drop cells 801 within the IC design to power taps 820 (FIG. 8C). FIG. 9A illustrates expanded polygons 812 provided around the paths 811 identified as discussed in reference to FIG. 8B, those polygons 812 bounding areas for mapping PGA shapes to supplement the existing power grid (the expanded paths generated in accordance with 504 of FIG. 3). FIG. 9B illustrates expanded polygons 822 provided around the paths identified as discussed in reference to FIG. 8C. The width of the polygon 812, 822 (between parallel edges of the polygon), which is centered on the minimum resistance path 811, 821 between the cell 801 and the tap 810, 820, is set according to settings of the guided PGA process. In the example of FIGS. 9A-9B, the width of the polygon 812, 822 is set to 16.0 times the row-site height. If the row-site height is equal to 0.5 then the width of a polygon 812, 822 is equal to 8.0 µm (16 times the row-site height), extending approximately 4.0 µm in either direction around the conductor wire of the minimum resistance path 811, 821. Utilizing a row-site height enables scaling for designs of different row site-height. The width of a polygon 812, 822 may be determined automatically, for example, based at least in part on one or more criteria for correlating a severity of IR-drop with a polygon width. The width of the polygon (or other defined input) can be used to characterize the number of adjacent layers for applying PGA around the identified minimum resistance path 811, 812. The guided PGA process can be applied within a single layer, or can be applied to multiple adjacent layers, as defined within executing instructions of the PGA process. For example, the executing instructions can include an indication of a user-specified instruction for executing PGA processes within single-layers only. As another example, the executing instructions can include instructions for executing a timing violation analysis of cells 801 after application of PGA shapes within the IC design. Because the addition of additional conductors provided in accordance with the PGA can increase capacitive effects of the overall power grid, the addition of these PGA shapes may negatively impact timing of signals traversing the various conductors within the IC design (e.g., through signal-conducting wires/shapes between cells 801 and/or power signals between taps 810, 820 and the various cells 801). Therefore, as a part of determining final locations for placement of PGA shapes, the timing violation analysis can ensure that no negative timing effects of signals are provided as a result of the addition of the PGA shapes, and PGA shapes that are determined to impact the timing of the IC design can be omitted. For certain designs, PGA shapes can be omitted within certain layers of the IC design, effectively resulting in the guided PGA process being performed only in certain layers of the IC design.

Figure 10:
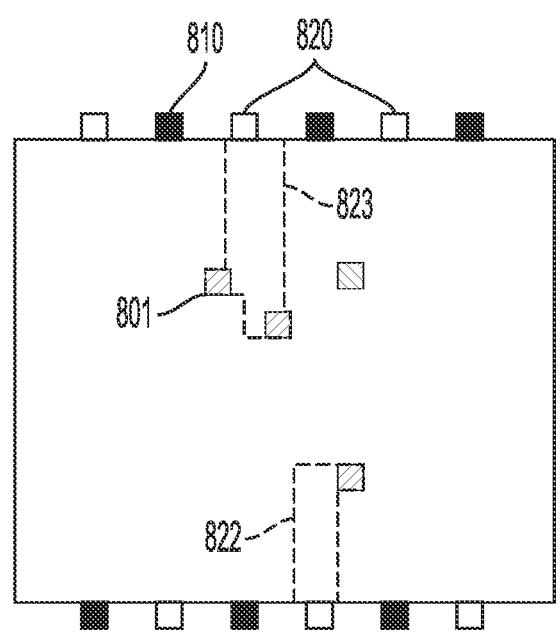
FIG. 10 illustrates merged polygons illustrated in FIG. 9B.

As illustrated in FIG. 10, the guided PGA process can avoid redundant checks of placement of PGA shapes in overlapping regions of various polygons 822 (as additionally reflected at 506 of FIG. 3). For example, rectangle union operations on polygons 822 (such as by generating a single polygon 823 encompassing overlapping and non-overlapping portions of multiple polygons, 822 such as the overlapping polygons 822 located in the upper portion of FIG. 9B) for combining overlapping polygons 822 into a single shape are shown in the example of FIG. 10, which includes a single cohesive polygon 823 in place of the multiple overlapping polygons 822 shown in the upper portion of FIG. 9B. The rectangle union operations are provided to identify overlapping polygons 822 (multiple polygons 822 having at least some area of the IC design that is contained within all of those multiple polygons 822), as well as unique boundaries of the overlapping polygons 822 so as to define a single, cohesive boundary that encompasses the entire area of all of the multiple polygons 822. Thereafter, PGA shapes are added within the identified polygon 823 regions, without adding PGA shapes in regions of the IC cell design outside of the identified polygons 822, 823 (as reflected at 508 of FIG. 3). The generated PGA shapes may be connected to existing power grid shapes using vias, as reflected at 510 of FIG. 3, and an additional IR drop analysis can be performed to ensure proper functionality of the IC design, as reflected at 512 of FIG. 3.

Figure 11B:
FIG. 11B illustrates the location of PGA shapes within an IC design provided with guided PGA processes.
Figure 11A:
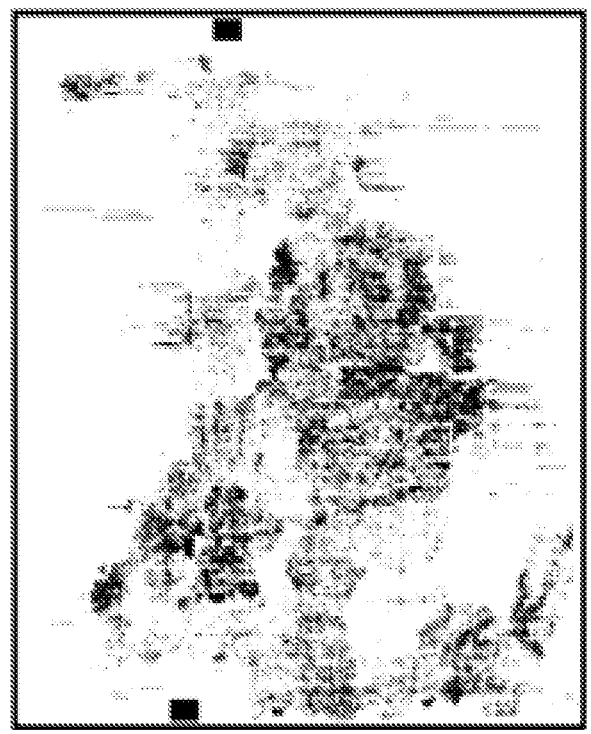
FIG. 11A illustrates the location of PGA shapes within an IC design provided with general PGA processes.

For comparison, FIG. 11A illustrates the locations of PGA shapes within a complete IC cell using a typical PGA generation system, while FIG. 11B illustrates the locations of PGA shapes within a complete IC cell using the present guided PGA generation system. Areas shown in white identify the location of wires and PGA shapes within the IC cell. As shown in FIG. 11B specifically, PGA shapes are only provided in certain specified areas, thereby maintaining a significant amount of routing resources (open space within the IC design) if additional changes to the IC design are needed after performing the guided PGA process. The effect of coupling capacitance on signal nets is decreased because fewer wires contributing to an overall coupling capacitance are included in the design. Overall, the total power grid shape area generated in accordance with the guided PGA process may be less than the power grid area generated as a result of typical PGA processes. As just one example, the guided PGA process may result in a power grid area between about 15% to about 40% of the area of a PGA area generated through typical PGA processes.

In application, use of the guided PGA process may be limited to specific, user-selected areas of an IC design and/or specific, user-selected layers of the IC design. For example, users may select cells for application of the guided PGA process (e.g., through an appropriate graphical user interface) based at least in part on certain characteristics of those cells. As a specific example, a user may identify a threshold for applying the guided PGA process (e.g., a resistance-value threshold, a number of cells-threshold, a cell percentage threshold, and/or the like). As yet another specific example, a user may select (via an appropriate interactive user interface) specific cells for applying the guided PGA process thereto. The systems and methods additionally identify cells subject to timing degradation, and the system may prevent application of the guided PGA process to those cells identified as subject to timing degradation.

Moreover, the guided PGA process may be utilized outside of the IC cell design context, such as for generating heuristics regarding the locations for providing PGA shapes for improving the performance of an IC design. For example, the guided PGA process can output data indicating the percentage of an IC design covered by PGA shapes as a result of the guided PGA process. The guided PGA process can additionally generate polygons for providing PGA shapes around other portions of an IC design beyond a wire trace following a minimum resistance path between a tap and a cell.

Figures 12A, 12B, 12C:
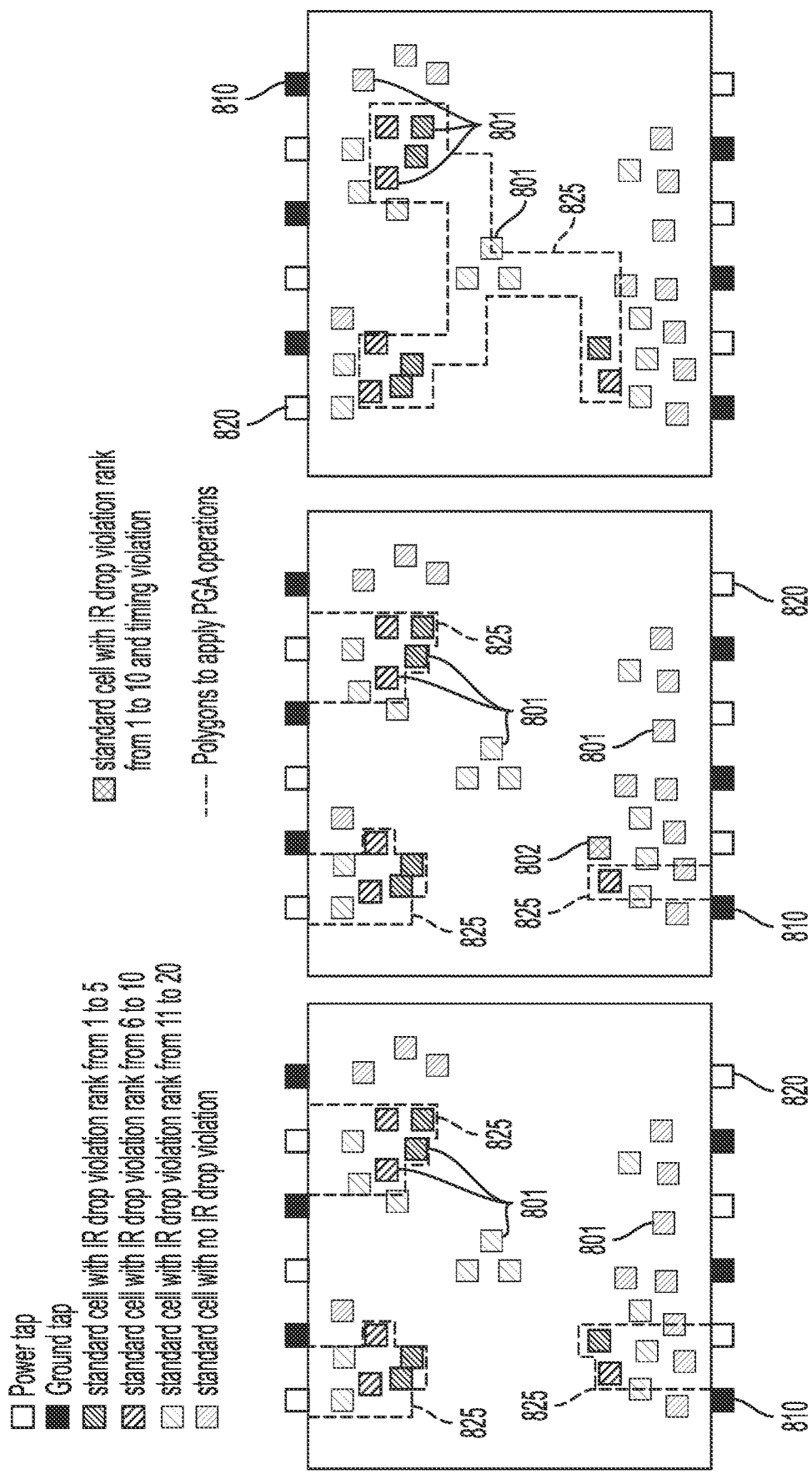
FIG. 12A illustrates the location of polygons drawn around groups of cells having high IR-drop characteristics in accordance with corresponding criteria.
FIG. 12B illustrates the location of polygons drawn around groups of cells having IR-drop characteristics in accordance with alternative corresponding criteria.
FIG. 12C illustrates the location of a polygon drawn around multiple groups of cells having IR-drop characteristics in accordance with corresponding criteria.

FIGS. 12A-12C illustrate examples of complexities that can be automatically addressed by the guided PGA process. Each figure within the illustrated FIGS. 12A-12C distinguishes between different tiers of cells 801 based on their determined IR-drop characteristics. Specifically, 3 tiers are illustrated, distinguished by shades of the representative cells 801 within each of FIGS. 12A-12C—a first tier reflects the 5 cells 801 having the 5 highest IR-drop values (having a violation rank from 1 to 5, with a violation rank of 1 having the highest IR-drop value and decreasing IR-drop values correspond with increasing violation rank numbers); a second tier reflects the 5 cells 801 having the next highest IR-drop values (the $6^{th}$-highest IR-drop value through the $10^{th}$-highest IR-drop value, indicated in the figure has having a violation rank from 6 to 10); and a third tier reflects the 10 cells 801 having the next highest IR-drop values (the $11^{th}$-highest IR-drop value through the $20^{th}$-highest IR drop value, indicated in the figure as having a violation rank from 11 to 20). The size of each tier (e.g., the violation ranks included in each tier), as well as instructions for selecting a particular number of cells 801 can be defined manually or automatically within the executing instructions of the guided PGA process. In each of the illustrated examples of FIGS. 12A-12C, the cells 801 falling within the top 2 tiers (collectively, the cells having the top-10 highest IR-drop values) are selected for guided PGA, according to which a polygon 825 is identified around the minimum resistance path between each of the identified cells and the appropriate taps and additional conductors are added within the identified polygons 825. These polygons 825 are generated to surround power grid shapes including IR-drop violating cells 801 as defined by algorithms (e.g., Steiner tree algorithms) and to add PGA shapes within the generated polygon 825 surrounding the included cells 801.

FIG. 12A specifically illustrates that polygons 825 can be drawn to include multiple cells 801, such as via the above-described process for identifying overlapping polygons 825 and generating a single polygon 825 to include the entirety of all of the areas of the overlapping polygons 825. FIG. 12B illustrates an additional complication, according to which one cell 802 (located proximate the bottom left of the figure, outside of the drawn polygon 825) is determined to have timing-related problems if PGA shapes are included within the IC design surrounding the minimum resistance path for the cell 802. For example, the placement of PGA shapes may cause high levels of coupling capacitance that impedes the transmission of signals to and from the cell 802. The above-described timing analysis can be performed for all cells 801 for which the guided PGA process is performed, and those cells 802 identified as having timing issues (e.g., signals transmitted to/from the cell arrive too early for use by the receiving cell or the signals transmitted to/from the cell arrive too late for use by the receiving cell) can be omitted from the guided PGA process such that no additional conductors are added around the minimum path resistance for those cells 802.

FIG. 12C illustrates yet another alternative for providing guided PGA after identifying those cells 801 for which the guided PGA process are to be performed. In the example of FIG. 12C, all of the cells 801 identified for the guided PGA process are bounded within a single polygon 825 within which PGA shapes are placed.

Figure 13:
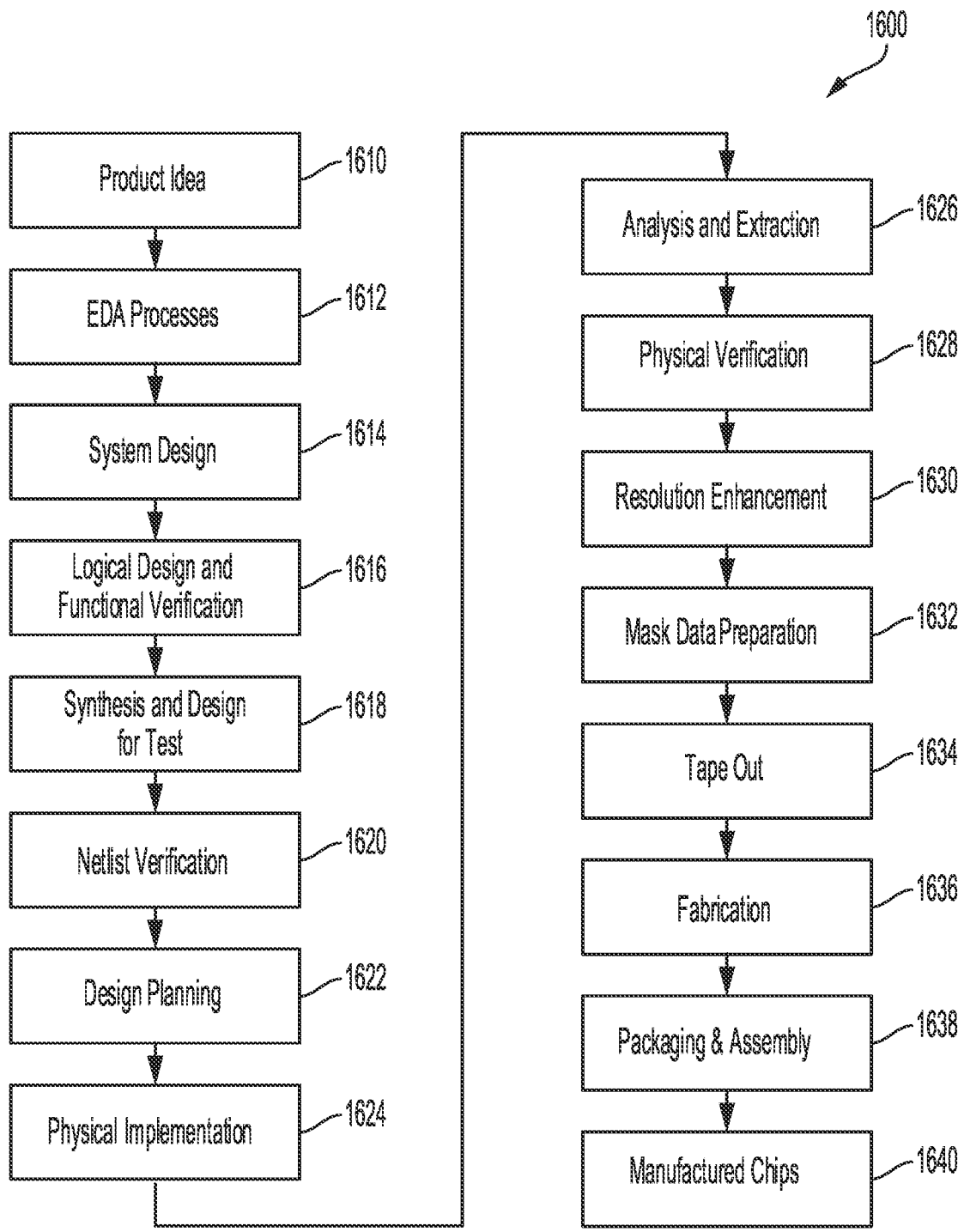
FIG. 13 depicts a flowchart of various processes used during the design and manufacture of an integrated circuit in accordance with some embodiments of the present disclosure.

FIG. 13 illustrates an example set of processes 1600 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 1610 with information supplied by a designer, information which is transformed to create an article of manufacture that uses a set of EDA processes 1612. When the design is finalized, the design is taped-out 1634, which is when artwork (e.g., geometric patterns) for the integrated circuit is sent to a fabrication facility to manufacture the mask set, which is then used to manufacture the integrated circuit. After tape-out, a semiconductor die is fabricated 1636 and packaging and assembly processes 1638 are performed to produce the finished integrated circuit 1640.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding tools of that layer (e.g., a formal verification tool). The processes described may be enabled by EDA products (or tools).

During system design 1614, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 1616, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 1618, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 1620, the netlist is checked for compliance with timing constraints and for correspondence with the HDL code. During design planning 1622, an overall floor plan for the integrated circuit is constructed and analyzed for timing and top-level routing.

During layout or physical implementation 1624, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 1626, the circuit function is verified at the layout level, which permits refinement of the layout design. During physical verification 1628, the layout design is checked to ensure that manufacturing constraints are correct, such as DRC constraints, electrical constraints, lithographic constraints, and that circuitry function matches the HDL design specification. During resolution enhancement 1630, the geometry of the layout is transformed to improve how the circuit design is manufactured.

During tape-out, data is created to be used (after lithographic enhancements are applied if appropriate) for production of lithography masks. During mask data preparation 1632, the 'tape-out' data is used to produce lithography masks that are used to produce finished integrated circuits.

A storage subsystem of a computer system (such as computer system 1700 of FIG. 14) may be used to store the programs and data structures that are used by some or all of the EDA products described herein, and products used for development of cells for the library and for physical and logical design that use the library.

Figure 14:
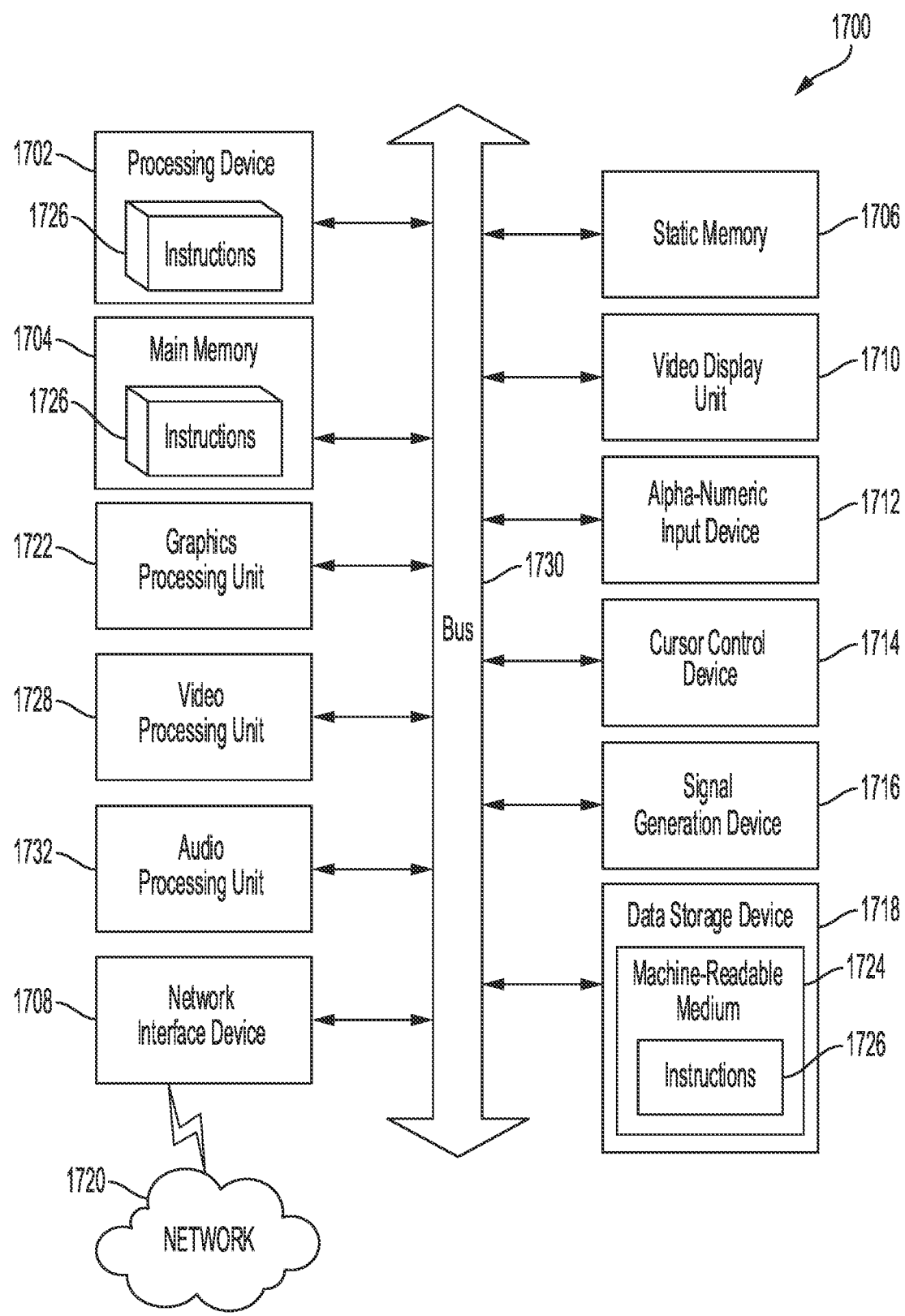
FIG. 14 depicts a diagram of an example computer system in which embodiments of the present disclosure may operate.

FIG. 14 illustrates an example machine of a computer system 1700 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1700 includes a processing device 1702, a main memory 1704 (e.g., read-only memory (ROM), flash memory, dynamic random access memory (DRAM) such as synchronous DRAM (SDRAM), a static memory 1706 (e.g., flash memory, static random access memory (SRAM), etc.), and a data storage device 1718, which communicate with each other via a bus 1730.

Processing device 1702 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1702 may also be one or more special-purpose processing devices such as an application specific integrated circuit (ASIC), a field programmable gate array (FPGA), a digital signal processor (DSP), network processor, or the like. The processing device 1702 may be configured to execute instructions 1726 for performing the operations and steps described herein.

The computer system 1700 may further include a network interface device 1708 to communicate over the network 1720. The computer system 1700 also may include a video display unit 1710 (e.g., a liquid crystal display (LCD) or a cathode ray tube (CRT)), an alphanumeric input device 1712 (e.g., a keyboard), a cursor control device 1714 (e.g., a mouse), a graphics processing unit 1722, a signal generation device 1716 (e.g., a speaker), graphics processing unit 1722, video processing unit 1728, and audio processing unit 1732.

The data storage device 1718 may include a machine-readable storage medium 1724 (also known as a non-transitory computer-readable medium) on which is stored one or more sets of instructions 1726 or software embodying any one or more of the methodologies or functions described herein. The instructions 1726 may also reside, completely or at least partially, within the main memory 1704 and/or within the processing device 1702 during execution thereof by the computer system 1700, the main memory 1704 and the processing device 1702 also constituting machine-readable storage media.

In some implementations, the instructions 1726 include instructions to implement functionality corresponding to the present disclosure. While the machine-readable storage medium 1724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1702 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

That which is claimed:

1. A method comprising:
   determining a minimum resistance path for each of a plurality of cells to connect a cell of the plurality of cells to an IC tap within an integrated circuit (IC) design comprising a plurality of cells;
   determining a voltage drop value for each of the plurality of cells;
   identifying a plurality of target cells selected from the plurality of cells, wherein the voltage drop value of each of the plurality of target cells satisfy one or more voltage drop criteria;
   defining polygons surrounding each minimum resistance path corresponding with each of the target cells; and
   generating conductors within the polygons.

2. The method of claim 1, wherein the identification of the minimum resistance path locations for each of the plurality of cells comprises an identification of portions of a power grid network within the minimum resistance path for each of the plurality of cells.

3. The method of claim 1, wherein identifying a plurality of target cells of the plurality of cells comprises:
   comparing IR-drop characteristics of each of the plurality of cells against the one or more IR-drop criteria; and
   identifying the plurality of target cells as cells having IR-drop characteristics satisfying the one or more IR-drop criteria.

4. The method of claim 1, wherein the one or more IR-drop criteria comprises one or more of a maximum number of target cells and a desired IR-drop value.

5. The method of claim 1, wherein the polygons are extended to include the plurality of target cells.

6. The method of claim 1, further comprising generating one or more vias to connect one or more conductors with one or more shapes of the power grid layout.

7. The method of claim 1, wherein executing IR-drop analysis for each of the plurality of cells comprises executing the IR-drop analysis for each connecting pin of each of the plurality of cells.

8. The method of claim 1, wherein the identification of minimum resistance path locations for connecting each of the plurality of cells to an IC tap comprises identifying the minimum resistance path extending between a pin to an IC tap.

9. The method of claim 1, wherein the identification of minimum resistance path locations for connecting each of the plurality of cells to an IC tap comprises identifying a minimum resistance path location for connecting each of the plurality of cells to a power IC tap and identifying a minimum resistance path location for connecting each of the plurality of cells to a ground IC tap.

10. The method of claim 1, wherein defining polygons surrounding the minimum resistance path locations corresponding with each of the target cells comprises defining at least one polygon including a plurality of target cells within boundaries of the at least one polygon.

11. The method of claim 1, further comprising:
    after defining polygons surrounding the minimum resistance path locations corresponding with each of the target cells, identifying one or more areas included within overlapping polygons;
    redefining at least one polygon to replace the overlapping polygons and to surround at least the area included within the overlapping polygons; and
    generating conductors within the redefined at least one polygon.

12. The method of claim 1, further comprising, after generating the conductors, routing at least one wire in a region of the IC design outside of the polygons.

13. A non-transitory computer-readable medium comprising stored instructions that, when executed by an apparatus, cause the apparatus to:
  determine a minimum resistance path for each of a plurality of cells to connect a cell of the plurality of cells to an IC tap within an integrated circuit (IC) design comprising a plurality of cells;
  determine a voltage drop value for each of the plurality of cells;
  identify a plurality of target cells selected from the plurality of cells, wherein the voltage drop value of each of the plurality of target cells satisfy one or more voltage drop criteria;
  define polygons surrounding each minimum resistance path corresponding with each of the target cells; and
  generate conductors within the polygons.

14. The non-transitory computer readable medium of claim 13, wherein identifying a plurality of target cells of the plurality of cells comprises:
  comparing IR-drop characteristics of each of the plurality of cells against the one or more IR-drop criteria; and
  identifying the plurality of target cells as cells having IR-drop characteristics satisfying the one or more IR-drop criteria.

15. The non-transitory computer readable medium of claim 13, wherein the identification of minimum resistance path locations for connecting each of the plurality of cells to an IC tap comprises identifying the minimum resistance path extending between a pin to an IC tap.

16. The non-transitory computer readable medium of claim 13, wherein the identification of minimum resistance path locations for connecting each of the plurality of cells to an IC tap comprises identifying a minimum resistance path location for connecting each of the plurality of cells to a power IC tap and identifying a minimum resistance path location for connecting each of the plurality of cells to a ground IC tap.

17. The non-transitory computer readable medium of claim 13, wherein defining polygons surrounding the minimum resistance path locations corresponding with each of the target cells comprises defining at least one polygon including a plurality of target cells within boundaries of the at least one polygon.

18. The non-transitory computer readable medium of claim 13, wherein at least one non-transitory computer storage medium for storing instructions that, when executed by an apparatus, further cause the apparatus to:
  after defining polygons surrounding the minimum resistance path locations corresponding with each of the target cells, identify one or more areas included within overlapping polygons;
  redefine at least one polygon to replace the overlapping polygons and to surround at least the area included within the overlapping polygons; and
  generate conductors within the redefined at least one polygon.

19. The non-transitory computer readable medium of claim 13, wherein at least one non-transitory computer storage medium for storing instructions that, when executed by an apparatus, further cause the apparatus to route at least one wire in a region of the IC design outside of the polygons after generating the conductors.

20. An apparatus comprising:
  a memory storing instructions; and
  a processor, coupled with the memory and to execute the instructions, the instructions when executed cause the processor to:
    determine a minimum resistance path for each of a plurality of cells to connect a cell of the plurality of cells to an IC tap within an integrated circuit (IC) design comprising a plurality of cells;
    determine a voltage drop value for each of the plurality of cells;
    identify a plurality of target cells selected from the plurality of cells, wherein the voltage drop value of each of the plurality of target cells satisfy one or more voltage drop criteria;
    define polygons surrounding each minimum resistance path corresponding with each of the target cells; and
    generate conductors within the polygons.

* * * * *